(12) United States Patent
Saenz De Ugarte et al.

(10) Patent No.: US 8,246,505 B2
(45) Date of Patent: Aug. 21, 2012

(54) PLANETARY TYPE GEAR UNIT COMPRISING A PLANET CARRIER WITH A PLANET BOGIE PLATE

(75) Inventors: Patrik Saenz De Ugarte, Sarriguren Pamplona (ES); Javier Baranano Etxebarria, Sarriguren Pamplona (ES); Gregory Warren Smook, Sint-Amandsberg (BE); Rik Verbiest, Sint-Amandsberg (BE); Wim Derkinderen, Hove (BE)

(73) Assignees: ZF Wind Power Antwerpen N.V., Kontich (BE); Gamesa Innovation & Technology, S.L., Pamplona (ES)

( * ) Notice: Subject to any disclaimer, the term of this patent is extended or adjusted under 35 U.S.C. 154(b) by 840 days.

(21) Appl. No.: 12/335,898

(22) Filed: Dec. 16, 2008

(65) Prior Publication Data

US 2009/0163316 A1 Jun. 25, 2009

(30) Foreign Application Priority Data

Dec. 19, 2007 (EP) .................................. 07076111

(51) Int. Cl.
*F16H 57/08* (2006.01)
*F16C 43/04* (2006.01)
*F16C 35/07* (2006.01)

(52) U.S. Cl. .................... 475/348; 475/331; 384/585
(58) Field of Classification Search .................. 475/331, 475/348; 384/585
See application file for complete search history.

(56) References Cited

U.S. PATENT DOCUMENTS

| 4,091,688 | A | * | 5/1978 | Huffman | 475/331 |
|---|---|---|---|---|---|
| 4,613,240 | A | * | 9/1986 | Hagelthorn | 384/585 |
| 5,795,037 | A | | 8/1998 | Hagelthorn | |
| 6,312,161 | B1 | * | 11/2001 | Williams | 384/585 |
| 2003/0086631 | A1 | | 5/2003 | Faltus et al. | |
| 2003/0123984 | A1 | | 7/2003 | Wilde et al. | |
| 2003/0236148 | A1 | * | 12/2003 | Fox | 475/348 |
| 2004/0141674 | A1 | | 7/2004 | Leimann | |
| 2006/0160655 | A1 | | 7/2006 | Smook et al. | |
| 2007/0099745 | A1 | * | 5/2007 | Fox | 475/331 |
| 2008/0026902 | A1 | | 1/2008 | Willie | |

FOREIGN PATENT DOCUMENTS

| DE | 37 01 397 | 7/1988 |
|---|---|---|
| EP | 1 377 754 | 1/2004 |
| WO | 01/57398 | 8/2001 |
| WO | 02/079658 | 10/2002 |
| WO | 2005/050059 | 6/2005 |
| WO | 2006/000214 | 1/2006 |

OTHER PUBLICATIONS

European Search Report dated May 26, 2008, from corresponding European application.

* cited by examiner

*Primary Examiner* — Justin Holmes
*Assistant Examiner* — Jacob S Scott
(74) *Attorney, Agent, or Firm* — Young & Thompson

(57) ABSTRACT

A planetary type gear unit comprising a planet carrier with a planet bogie plate and at least one planet shaft, whereby on both sides of the bogie plate a planet wheel is mounted on the planet shaft by taper roller bearings, whereby the planet shaft is provided with an axially displaceable piece on each of its extremities forming an abutment which provides an axial support for the inner bearing rings of the taper roller bearings and with a tensioning elements by which the axially displaceable pieces can be displaced to one another for controlling the pre-tensioning on the taper roller bearings.

17 Claims, 4 Drawing Sheets

PLANETARY TYPE GEAR UNIT COMPRISING A PLANET CARRIER WITH A PLANET BOGIE PLATE

BACKGROUND OF THE INVENTION

1. Field of the Invention

The present invention relates to a planetary type gear unit with sun, planet and ring gears and a planet carrier, said planet carrier comprising a planet bogie plate and at least one planet shaft, whereby on both sides of the bogie plate a planet wheel is mounted on the planet shaft by means of taper roller bearings.

More specifically but not exclusively the present invention relates to a planetary gear unit of the mentioned type for use in a wind turbine.

2. Description of the Related Art

Such planetary type gear units are known according to the state of the art.

In the technology of wind turbines for example there is a tendency to integrate components in order to reduce the overall weight so that the related loads and resulting stresses on the structure of the wind turbine can be minimized.

Typical integration is obtained by the use of a planetary type gear unit whereby the bearing supporting the planet carrier also serves as a main bearing for supporting the rotor hub to which the planet carrier is connected.

However, a consequence of using one main bearing is that the support of the rotor hub, as well as the planet carrier is less rigid than in the more classical designs whereby the rotor hub is supported by separate bearings.

This causes misalignments between the planet carrier and the ring wheel which vary during the rotation, hereby augmenting the risk of damage to the planet wheels.

A known solution to this problem is the use of a so-called bogie plate on the planet carrier.

Such a bogie plate is provided with planet shafts, whereby on both sides of the bogie plate planet wheels can be mounted on each shaft by means of planet bearings.

It is known that such a planetary gear stage with a bogie plate on the planet carrier allows for some misalignments between the planet carrier and the ring wheel without negatively affecting the gear meshing.

Often taper roller bearings are used for the support of the planet wheels, since these type of bearings are able to bear a considerable load in axial, as well as radial direction.

Nevertheless, the planet bearings are one of the more sensitive parts of the gear unit.

Premature failure of the presently known planet bearings is a common problem, which can be caused by dynamic effects due to the clearance in the bearings and to deformations of the bearings under influence of the load.

Furthermore, the more the designs get integrated, the more the space available between the planet carrier and the planet wheels becomes limited, which complicates for example the assembly and the maintenance of the gear unit or adjustment of certain components.

Another disadvantage of the presently known gear units is that the assembly of the planet bearings, especially of taper roller bearings, requires a considerable axial space, which limits the compactness of the design.

Still another disadvantage of existing gear units is that the proper assembly of the planet bearings is only possible when the planet carrier is dismounted.

SUMMARY OF THE INVENTION

The present invention aims at a gear unit, for example a gear unit used in a wind turbine, which does not show one or more of the above and other disadvantages.

To this aim, the invention relates to a planetary type gear unit comprising sun, planet and ring gears and a planet carrier, said planet carrier comprising a planet bogie plate and at least one planet shaft, whereby on both sides of the bogie plate a planet wheel is mounted on the planet shaft by means of taper roller bearings, the planet shaft being provided with an axially displaceable piece on each of its extremities forming an abutment which provides an axial support for the inner bearing rings of said taper roller bearings and with tensioning means by which said axially displaceable pieces can be displaced to one another for controlling the pre-tensioning on the taper roller bearings.

An important advantage of such a gear unit according to the present invention is that through displacement of the axially displaceable pieces with the tensioning means the pre-tensioning on the taper roller planet bearings can be controlled and hereby clearance in the bearings can be avoided or at least limited, so that failure of the planet to bearings due to misalignments and dynamic effects is reduced.

According to a preferred embodiment of a gear unit in accordance with the present invention the axially displaceable pieces are formed by abutment plates, respectively a first and a second abutment plate.

An advantage of this embodiment of a gear unit according to the invention is that the abutment plates provide a well distributed axial support for the inner bearing rings of the taper roller planet bearings, hereby spreading the load of the pre-tensioning of the bearings over a sufficiently large surface.

According to a still more preferred embodiment of a gear unit in accordance with the present invention, the tensioning means consist additionally of a central rod which can be brought into an axial passage provided in the planet shaft, the rod being connectable to the first abutment plate at a first of its extremities, while it passes through a central hole provided in the second abutment plate at its second extremity, this second extremity being provided with an external thread on which a nut can be screwed against the second abutment plate.

The big advantage of this embodiment of a gear unit in accordance with the present invention is that the pre-tensioning on the taper rollers or the limitation of the clearance in the taper roller planet bearings can simply be regulated with the nut at the side of the second abutment plate.

Preferably, according to the invention, the central rod is connectable to the first abutment plate by means of an external thread on the rod's first extremity which extremity is screwed into an internal threaded hole in the first abutment plate, whereby the second extremity is provided with means for applying a torque to the rod.

This embodiment of a gear unit in accordance with the invention has the advantage that everything can be mounted from one side, i.e. the side of the second abutment plate, without need for access to the first abutment plate at the other side of the bogie plate.

This implicates a considerable advantage with regard to the known designs, since there is no need anymore for dismounting of the planet carrier.

BRIEF DESCRIPTION OF THE DRAWING FIGURES

With the intention of better showing the characteristics of the invention, hereafter, as an example without any restrictive character whatsoever, some preferred forms of embodiment of a gear unit according to the present invention, with reference to the accompanying drawings, wherein:

FIG. 1 schematically represents a typical wind turbine wherein a planetary type gear unit in accordance with the present invention is integrated;

FIG. 3 represents on a still bigger scale the part which is indicated by F3 in FIG. 2; and, FIG. 4 represents a cross-section similar to the one in FIG. 3 of another embodiment of a gear unit in accordance with the present invention.

DETAILED DESCRIPTION OF THE INVENTION

Figure 1:
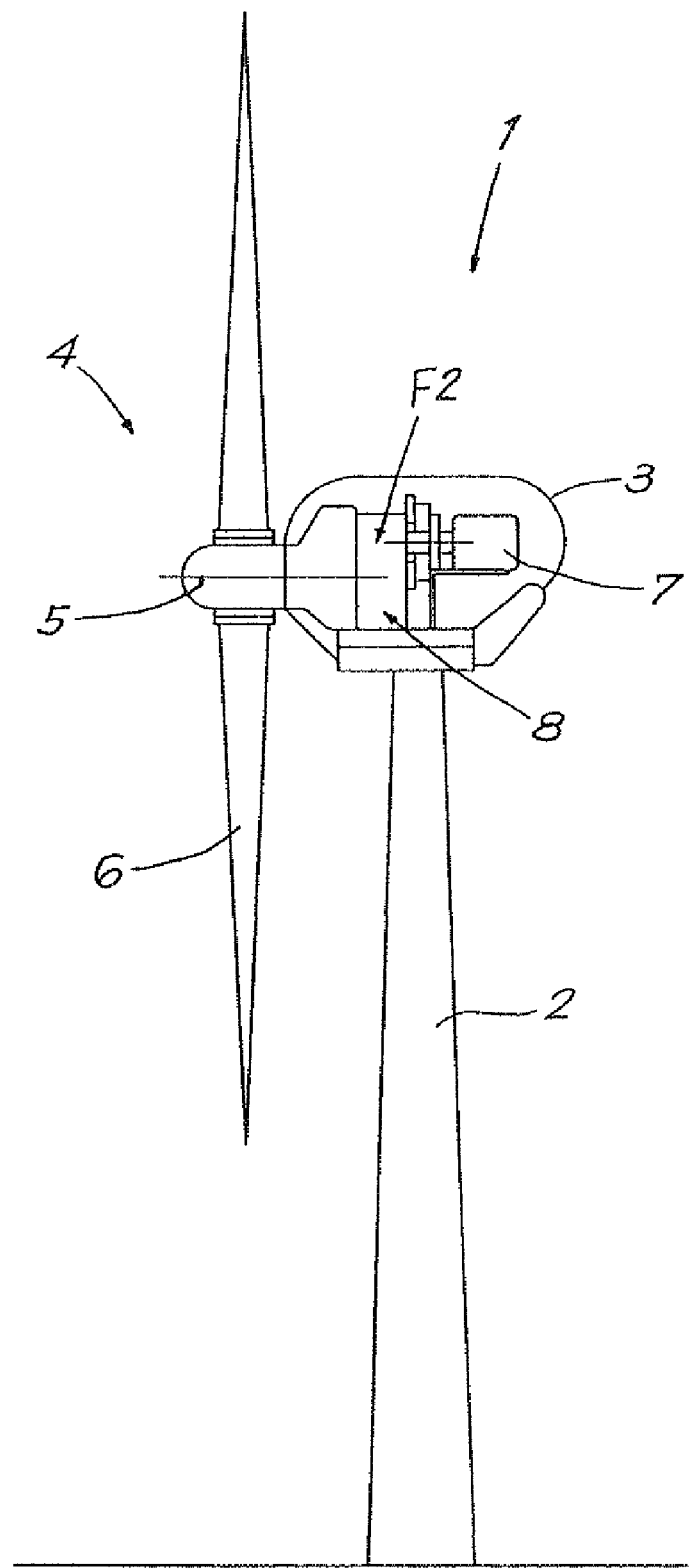

The wind turbine 1 represented in FIG. 1 comprises a static supporting structure 2 on which a nacelle 3 is mounted rotatably, which allows for the adjustment of the position of the wind turbine 1 to the wind direction.

In the nacelle 3 a rotor 4 with rotor hub 5 and rotor blades 6 is mounted, whereby the rotor hub 5 is connected to a generator set 7 through a gear unit 8.

Figure 2:
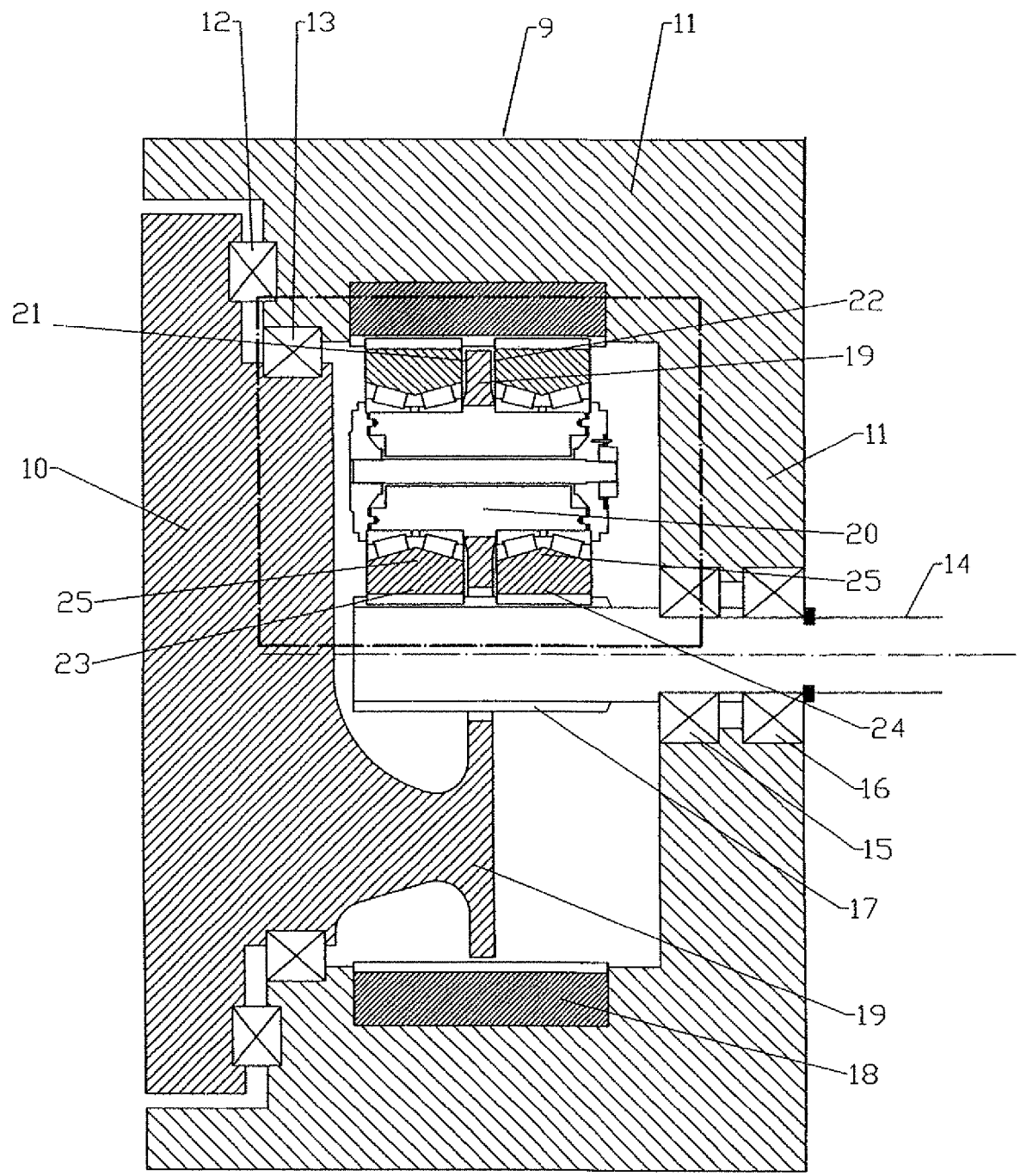
FIGS. 2 and 3 represent on a bigger scale and in cross-section the part of the gear unit in accordance with the present invention indicated by F2 in FIG. 1.

As is represented more in detail in FIG. 2, the gear unit 8 is in this embodiment of the planetary type, having a planetary stage 9.

The planet carrier 10 of this planetary gear stage 9 is mounted rotatably in a housing structure 11 by means of a bearing 12 and a bearing 13, the housing structure 11 being rigidly connected to the nacelle 3 of the wind turbine (not shown in the figure).

The planet carrier 10 is connected to the rotor hub 5 and serves as input shaft of the planetary gear stage 9.

The output shaft 14 of the planetary gear stage 9 is connected directly or indirectly through other parts of the gear unit 8 to the generator set 7 (not shown in the figure).

Hereby, the output shaft 14 is mounted rotatably in the housing structure 11 by means of a pair of roller bearings 15 and 16, whereby on the output shaft 14 a sun wheel 17 is provided.

Furthermore, in the housing structure 11 a ring wheel 18 is incorporated in a fixed manner, for example by means of bolts or whatever connection means.

The planet carrier 10 is provided with a particular feature which is already known according to the present state of the art, i.e. a bogie plate 19. This bogie plate 19 provides in its turn support for multiple planet shafts 20.

Hereby, the planet shafts 20 extend from both sides 21 and 22 of the bogie plate 19, so that on each planet shaft 20 a pair of planet wheels 23 and 24 can be mounted, the planet wheels 23 and 24 of each pair lying on opposite sides of the bogie plate 19, respectively sides 21 and 22.

Each planet wheel 23 and 24 is supported rotatably on the planet shafts 20 by means of planet wheel bearings 25, which in this case are taper roller bearings 25.

It is common knowledge that in a case like the one of FIG. 2, the relatively slow rotation of the planet carrier 10 at the input shaft is transformed in a relatively fast rotation of the sun wheel 17 at the output shaft 14 by the interaction between the planet wheels 23 and 24 with, on the one hand, the static ring wheel 18 and, on the other hand, with the sun wheel 17.

In the case of a wind turbine 1 this means that the slow rotation on the rotor 4 caused by the wind is transformed in a rotation at the output shaft 14, which is sufficiently fast in order to allow the power generator 7 to function properly.

It is also known that with the configuration of FIG. 2, whereby a bogie plate 19 is connected to the planet carrier 10 and whereby on both sides 21 and 22 of the bogie plate 19 planet wheels 23 and 24 are provided, a certain amount of misalignment between the ring wheel 18 and the planet carrier 10 caused by the weight of the rotor 4 and/or dynamic loads on the rotor 4 can be absorbed.

As mentioned in the introduction the planet bearings 25 are very sensitive parts of the gear unit 8.

Too much clearance in the taper roller planet bearings 25 for example can cause premature failure of the bearings 25.

Figure 3:
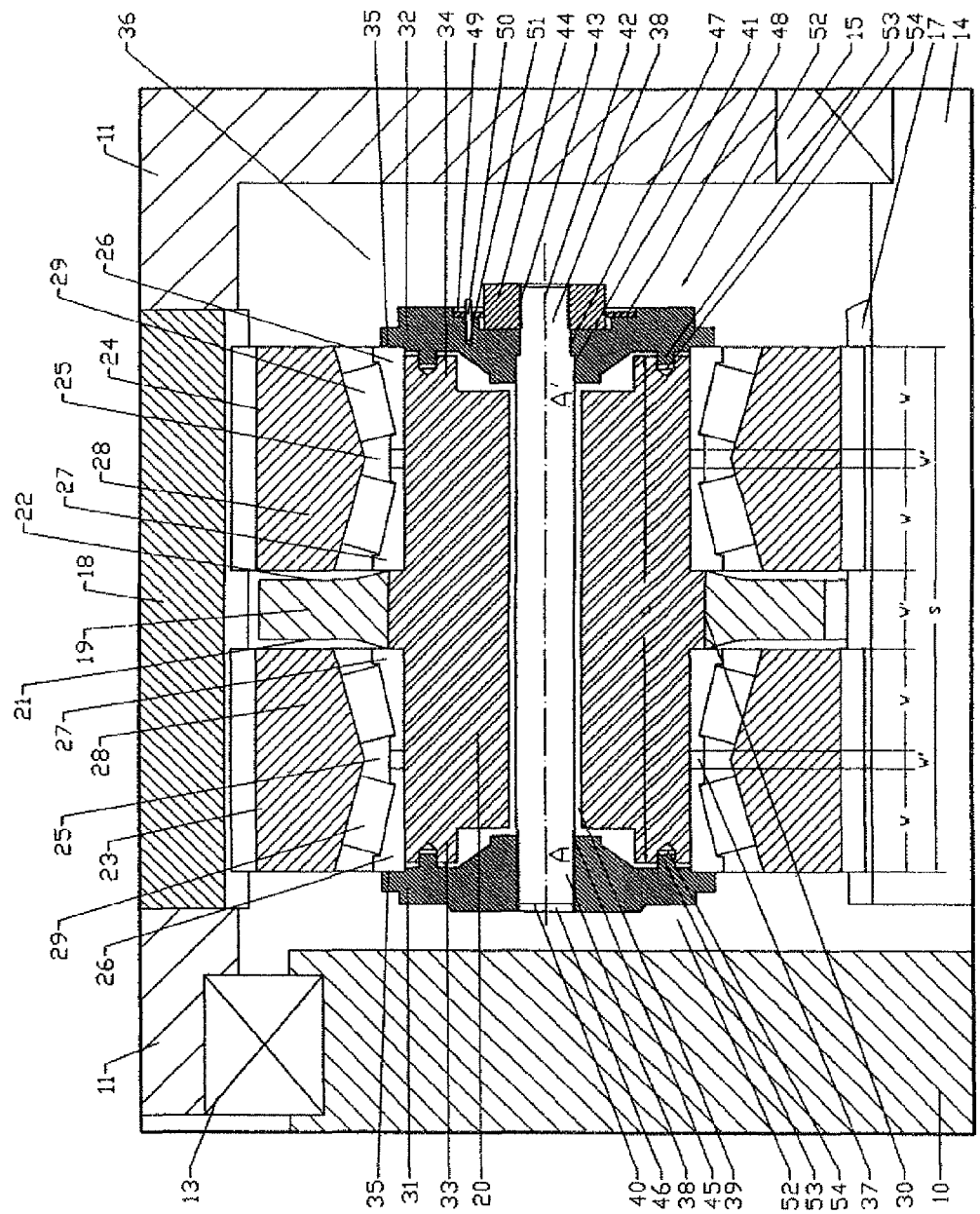

As is represented more in detail in FIG. 3, these bearings 25 comprise inner bearing rings 26 and 27, outer bearing rings 28, and, between these inner bearing rings 26 and 27 and outer bearing rings 28, the taper rollers 29.

In the represented example of FIGS. 2 and 3, each planet gear 23 and 24 is supported by a double taper roller bearing 25 having a single outer bearing ring 28, this outer bearing ring 28 being integrated in the represented case in its corresponding planet wheel 23 or 24.

However embodiments whereby each planet gear 23 and 24 is supported by a pair of taper roller bearings, having for example separate outer bearing rings which are not integrated in the planet wheels, are not excluded according to the invention.

The outer bearing rings 28 of the taper roller planet bearings 25 support the actual planet gear wheels 23 and are fixedly connected to these planet gear wheels 23 so that they rotate simultaneously with the planet gear wheels 23 when the gear unit 8 is functioning.

Similarly, the single outer ring 28 of the double taper bearings 25 could as well be a part of the planet gear 23 or 24 it supports.

The inner bearing rings 26 and 27 closely surround the planet shaft 20 while being slidable over the planet shaft 20 in the axial direction AA'.

Movement in the axial direction AA' towards the bogie plate 19 of the inner bearing rings 27 lying near the bogie plate 19 is prevented by a shoulder 30 provided at the planet shaft 20 forming an axial abutment.

Special for the invention is the way the other inner bearing rings 26 of the taper roller bearings 25 are supported in the axial direction AA'.

According to the present invention the planet shaft 20 is provided with an axially displaceable piece 31 and 32 on each of its extremities, respectively 33 and 34, forming an abutment 35 which provides an axial support for the inner bearing rings 26.

Additionally, according to the present invention, tensioning means 36 are provided by which said axially displaceable pieces 31 and 32 can be displaced to one another for controlling the pre-tensioning on the taper roller bearings 25.

According to a preferred embodiment of a planetary type gear unit 8 in accordance with the present invention, at least one of said axially displaceable pieces 31 and 32 is formed by a first abutment plate 31.

In the case of FIG. 3 both axially displaceable pieces 31 and 32 are formed by abutment plates, respectively a first abutment plate 31 and a second abutment plate 32.

These abutment plates 31 and 32 cover the planet shaft 20 at its extremities, respectively at first extremity 33 and at second extremity 34, while being in contact with the inner bearing rings 26 over a sufficiently large radial directed contact surface between the abutment plates 31 and 32 on the one hand, and the inner bearing rings 26 on the other hand.

In that way a good axial support for the inner bearing rings 26 is provided.

It is important to notice that the total axial length L of the planet shaft 20 is somewhat smaller than the sum S of the width W of the four inner bearing rings 26 and 27, the width W' of the shoulder 30 and the width W" of the gaps 37 between the inner bearing rings 26 and 27 of each double taper roller bearing 25.

According to a preferred embodiment of a gear unit 8 in accordance with the present invention, as in the case of FIG. 3, the tensioning means 36 consist of a central rod 38 which can be brought into an axial passage 39 provided in the planet shaft 20.

Hereby, the rod 38 is connectable to the first abutment plate 31 at a first of its extremities 40, while it passes through a central hole 41 provided in the second abutment plate 32 at its second extremity 42, this second extremity 42 being provided with an external thread 43 on which a nut 44 can be screwed against the second abutment plate 32.

In the embodiment represented in FIG. 3, the central rod 38 is connectable to the first abutment plate 31 by means of an external thread 45 on the rod's first extremity 40, which extremity 41 is screwed into an internal threaded hole 46 in the first abutment plate 31.

Preferably the second extremity 42 of the rod 38 is hereby provided with means for applying a torque to the rod 38 which allows the rod 38 to be screwed in the first abutment plate 31 from the side which is in practice the most accessible, i.e. the side at the second extremity 42 far away from the planet carrier 10.

According to a still more preferred embodiment of planetary type gear unit 8 in accordance with the present invention, the central rod 38 has a non circular cross-section 47, which corresponds to a non-circular hole in the second abutment plate 32, in order to prevent said abutment plate 32 from rotating with regard to the rod 38.

Preferably, also a locking plate 48 is provided with a central hole corresponding to the circumference of the nut 44, the plate 48 being slidable over the nut 44 into a recess 49 in the second abutment plate 32 and being lockable with regard to the second abutment plate 32 by a pin 50 through the locking plate 48 into a hole 51 in the second abutment plate 32.

Additionally, it is preferable that locking means 52 are provided by which the axially displaceable pieces 31 and 32 can be locked on the planet shaft 20 in order to prevent the pieces 31 and 32 from rotating with regard to the planet shaft 20, whereby not necessarily the displacement in an axial direction AA' is prevented.

In the embodiment of FIGS. 2 and 3 said locking means 52 comprise at least one axially extending pin 53, which can be slid in a corresponding hole or groove 54 in the planet shaft 20.

Alternatively the hole or groove 54 could also be provided in the pieces 31 or 32.

Preferably, there are multiple holes or grooves 54 provided in the planet shaft 20 or in the abutment plates 31 and 32 which are evenly distributed around the circumference of the abutment plates 31 and 32 or the shaft 20, so that the abutment plate can be locked against rotation in the most suitable position.

Assembly of a planetary type gear unit 8 according to the invention, is simple and as follows.

During the assembly, the double taper roller planet bearings 25 are slid over the planet shaft 20 until they abut against the shoulder 30 on the planet shaft 20.

Subsequently, the central rod 38 is brought into the axial passage 39 in the planet shaft 20 and the first abutment plate 31 is brought against the planet shaft 20. Hereby the pin 53 is slid into the hole 54 in said planet shaft 20, which prevents the first abutment plate 31 from rotating with regard to the planet shaft 20.

This allows the rod 38 to be screwed into the first abutment plate 31 whereby preferably the means for applying a torque to the rod 38 provided at the second extremity 42 are activated. This is advantageous, since this extremity 42 of the rod 38 is more accessible than the other extremity 40 where there is only a limited space between the planet carrier 10 and the first abutment plate 31.

Then, at the second extremity 34 of the planet shaft 20, the second abutment plate 32 is brought over the central rod 38, whereby the second extremity 42 of the rod 38 is brought through the central hole 41 in the second abutment plate 32.

Hereby the non-circular section 47 of the rod 38 ensures that the second abutment plate 31 cannot rotate with regard to the rod 38.

Furthermore, the rotation of the second abutment plate 32 and as a consequence also of the rod 38 with regard to the planet shaft 20 is prevented, since the pin 53 is slid in the hole 54 in the planet shaft 20.

The combination of the non-circular section 47 and the pins 53 at both extremities 40 and 42 ensures that the rod 38 cannot loosen from the first abutment plate 31.

In order to put some tension on the double taper roller bearings 25 so that the clearance in the bearings 25 is correctly set, the tensioning means 36 in the form of the nut 44 are activated.

By screwing this nut 44 against the second abutment plate 32, the inner bearing rings 27, lying near the bogie plate 19, are displaced to one another until they meet the shoulder 30 on the planet shaft 20.

Further tightening of the nut 44 results in a pre-tension on the bearings 25 whereby one of the aims of the present invention is obtained, i.e. a correct setting of the pre-tensioning on the bearings 25.

When a sufficient tension on the bearings 25 is obtained, the locking plate 48 is brought over the nut 44 into the recess 49 in the second abutment plate 32.

By inserting pin 50 in hole 51, also nut 44 is prevented from rotating with regard to the second abutment plate 32, so that loosening of the nut 44 is impossible and the safety of the assembly is guaranteed.

Figure 4:
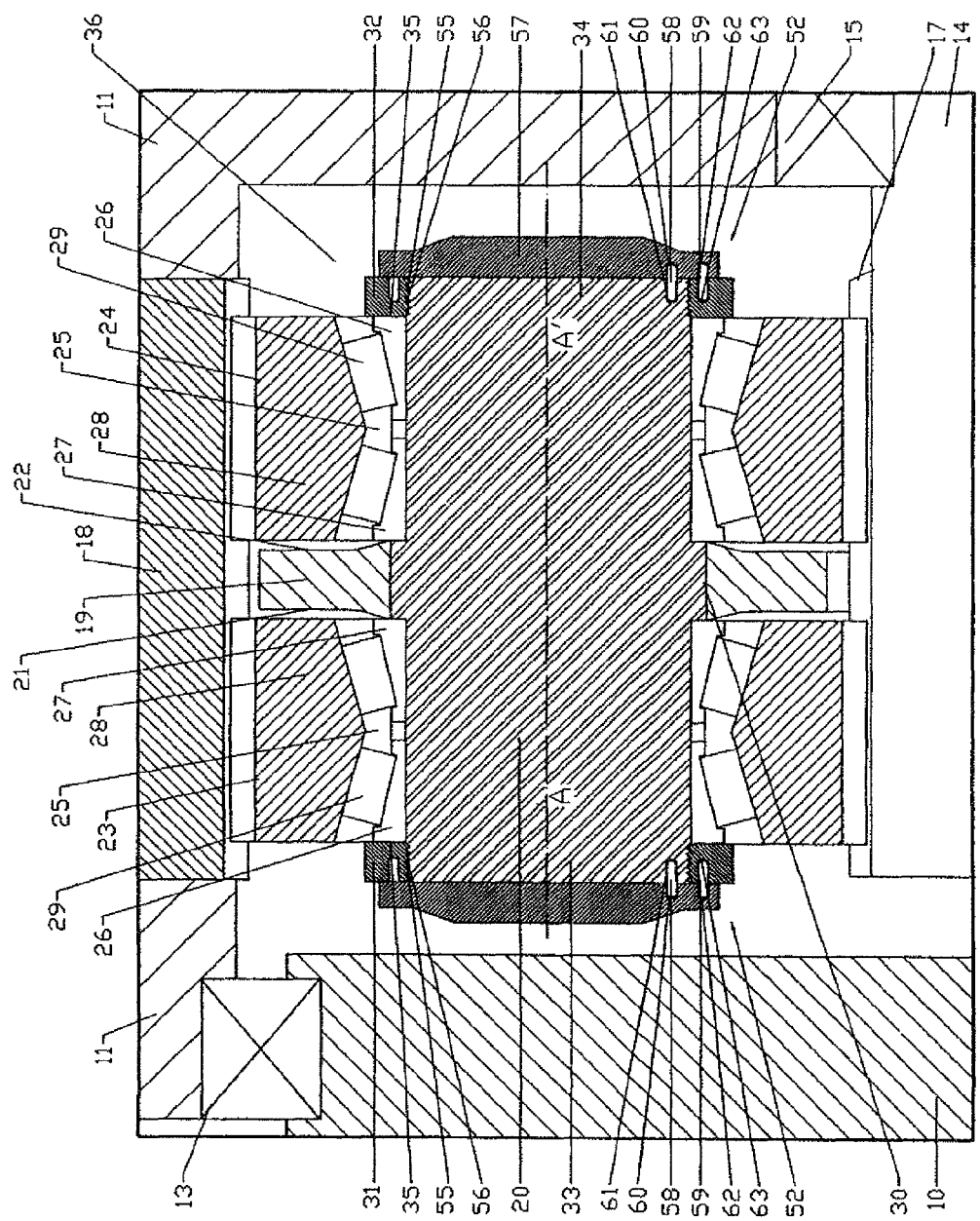

In FIG. 4 another embodiment of a planetary type gear unit in accordance with the present invention is represented.

This embodiment is somewhat simpler in construction since the axially displaceable pieces 31 and 32 are this time nuts 31 and 32 with an internal thread 55 which corresponds to an external thread 56 on the planet shaft 20.

The nuts 31 and 32 fulfill at the same time the role of tensioning means 36.

The construction might be somewhat simpler, the assembly is however somewhat more complex, since both nuts 31 and 32 have to be tightened in order to obtain the required tension on the bearings 25.

This means that the pre-tensioning is not obtained solely by applying a torque force at the extremity 34 of the planet shaft 20.

Someone has to apply necessarily a force at both extremities 33 and 34, which can be somewhat more complicated by the lack of space, especially at the side of the first extremity 33.

Also the locking means 52 are somewhat different in form than in the preceding example.

This time these locking means 52 comprise (at each extremity 33 and 34 of the planet shaft 20) a plate 57 and two axially extending pins, respectively a first pin 58 and a second pin 59.

Hereby, corresponding holes 60, 61, 62 and 63 are provided on the planet shaft 20, in the plate 57 and on the axially displaceable pieces 31 or 32 (the nuts), in which the respective pins 58 and 59 can be brought.

For example, the first pin 58 is retained by a first hole 60 in the plate 57 and by a corresponding hole 61 provided in the planet shaft 20.

Similarly, the second pin 59 is kept by a second hole 62 in the plate 57 and a corresponding hole 63 in the nut 31 or 32.

In that manner a rotation from the plate 57 is prevented, on the one hand, with regard to the planet shaft 20 by the first pin 58, and, on the other hand, with regard to the nut 31 or 32 by the second pin 59.

Preferably, multiple holes 60 to 63 are provided in the respective parts of the assembly, for example evenly distributed over the circumference of the parts.

The more holes are provided, the more positions there are in which the nuts 31, the plate 57 and the planet shaft 20 can be locked with regard to one another, which allows for a precise determination of the pre-tensioning on the bearings 25.

According to a preferred embodiment of a gear unit 8 in accordance with the present invention, the holes 60 and 62 in the plate 57 are blind holes.

In that way, it is prevented that a pin 58 or 59 will fall between the different gears of the gear unit 8 in the case of failure of one of the pins 58 or 59, which might cause considerable damage to the gear unit 8.

It is clear that many other embodiments of a gear unit are possible without departure from the scope of the invention.

The locking means 52 by which the tensioning means 36 are locked with regard to the planet shaft 20 could for example comprise whatever mechanical device, like split pins, integrated pins, external pins, etc. . . . .

Also other methods, like welding, or gluing, could be applied in order to obtain a proper locking of the different parts.

Also the particular form of the planetary type gear unit 8 is of no importance, be it a gear unit with a rotating planet carrier 10 and a stationary ring wheel 18 or otherwise with a rotating ring wheel 18 and a stationary planet carrier 10.

The present invention is in no way limited to the embodiments described above and represented in the drawings, but such a planetary type gear unit 8 may be realised in different shapes and dimensions, without departure from the scope of the invention.

The invention claimed is:

1. A planetary gear unit (8), comprising:
   sun (17), planet (24) and ring (18) gears;
   a planet carrier comprising a planet bogie plate (19) and at least one planet shaft (20) on both sides (21,22) of the bogie plate (19);
   a planet wheel (23, 24) mounted on the at least one planet shaft (20) via taper roller bearings (25);
   an axially displaceable piece (31,32) on each of extremities (33,34) of the at least one planet shaft (20) forming an abutment (35) which provides an axial support for inner bearing rings (26,27) of said taper roller bearings (25), both axially displaceable pieces (31,32) being formed by abutment plates (31,32), respectively a first abutment plate (31) and a second abutment plate (32);
   means for tensioning (36) by which said axially displaceable pieces (31,32) can be displaced toward one another for controlling pre-tensioning on the taper roller bearings (25), the means for tensioning comprising a central rod (38) which can be brought into an axial passage (39) provided in the planet shaft (20), the rod (38) being connectable to the first abutment plate (31) at a first extremity (40) of the rod (38), while the rod passes through a central hole (41) provided in the second abutment plate (32) at a second extremity (42) of the rod (38), the second extremity (42) being provided with an external thread (43) on which a nut (44) can be screwed against the second abutment plate (32); and
   means for locking (52) are provided by which said axially displaceable pieces (31,32) can be locked on the planet shaft (20) in order to prevent said axially displaceable pieces (31,32) from rotating with respect to the at least one planet shaft (20).

2. The planetary gear unit according to claim 1, wherein the central rod (38) is connectable to the first abutment plate (31) by an external thread (45) on the rod's first extremity (40), the extremity (40) being screwed into an internal threaded hole (46) in the first abutment plate (31) and whereby the second extremity (42) is provided with means for applying a torque to the rod (38).

3. The planetary gear unit according to claim 2, wherein the central rod (38) has a non circular cross-section (47), which corresponds to a non-circular hole in the second abutment plate (32), in order to prevent said abutment plate (32) to rotate with respect to the rod (38).

4. The planetary gear unit according to claim 2, wherein a locking plate (48) is provided with a central hole corresponding to the circumference of the nut (44), the plate (48) being slidable over the nut (44) into a recess (49) in the second abutment plate (32) and being lockable with respect to the second abutment plate (32) by a pin (50) through the locking plate (48) into a hole (51) in the second abutment plate (32).

5. The planetary gear unit according to claim 1, wherein the central rod (38) has a non circular cross-section (47), which corresponds to a non-circular hole in the second abutment plate (32), in order to prevent said abutment plate (32) to rotate with respect to the rod (38).

6. The planetary gear unit according to claim 1, wherein a locking plate (48) is provided with a central hole corresponding to a circumference of the nut (44), the locking plate (48) being slidable over the nut (44) into a recess (49) in the second abutment plate (32) and being lockable with respect to the second abutment plate (32) by a pin (50) through the locking plate (48) into a hole (51) in the second abutment plate (32).

7. The planetary type gear unit according to claim 1, wherein the means for locking (52) do not prevent a displacement of the axially displaceable pieces (31,32) in an axial direction (AA').

8. The planetary gear unit according to claim 1, wherein each planet gear (23,24) is supported by a pair of taper roller bearings.

9. The planetary gear unit according to claim 8, wherein each taper roller bearing of said pairs of taper roller bearings has one or more outer bearing rings, which are not integrated in the planet gears (23,24).

10. The planetary gear unit according to claim 1, wherein each planet gear (23,24) is supported by a double taper roller bearing (25) having a single outer bearing ring (28).

11. The planetary gear unit according to claim 10, wherein the outer ring (28) of said double taper bearings (25) is a part of the planet gear (23,24) which is supported by the outer ring (28).

12. The planetary gear unit according to claim 1, wherein the at least one planet shaft (20) is provided with a shoulder (30) for the inner bearing rings (26) lying near the bogie plate (19) forming an axial abutment when the axially displaceable pieces (31,32) are displaced towards one another by tightening the means for tensioning (36).

13. The planetary gear unit according to claim 1, wherein the planetary gear is part of a wind turbine (1).

14. A planetary gear unit (8), comprising:

sun (17), planet (24) and ring (18) gears;

a planet carrier comprising a planet bogie plate (19) and at least one planet shaft (20) on both sides (21,22) of the bogie plate (19);

a planet wheel (23, 24) mounted on the at least one planet shaft (20) via taper roller bearings (25);

an axially displaceable piece (31,32) on each of extremities (33,34) of the at least one planet shaft (20) forming an abutment (35) which provides an axial support for inner bearing rings (26,27) of said taper roller bearings (25;

means for tensioning (36) by which said axially displaceable pieces (31,32) can be displaced toward one another for controlling pre-tensioning on the taper roller bearings (25); and means for locking (52) are provided by which said axially displaceable pieces (31,32) can be locked on the planet shaft (20) in order to prevent said axially displaceable pieces (31,32) from rotating with respect to the at least one planet shaft (20), wherein the means for locking (52) comprise at least one axially extending pin (53), which can be slid in a corresponding hole or groove (54) in the at least one planet shaft (20) or in at least one of the axially displaceable pieces (31,32), and the means for locking (52) comprise a plate (57) and two axially extending pins(58,59), and corresponding holes (60-63) are provided on the at least one planet shaft (20), in the plate (57)and on the axially displaceable piece (31,32) in which the respective pins (58,59) can be brought, so that a rotation from the plate (57) is prevented, with respect to the planet shaft (20) by the first pin (58), and with respect to the axially displaceable piece (31,32) by the second pin (59).

15. The planetary gear unit according to claim 14, wherein the holes (60,62) in the plate (57) are blind holes.

16. The planetary gear unit according to claim 14, wherein the axially displaceable pieces (31,32) are nuts (31,32) with an internal thread (55) which corresponds to an external thread (56) on the planet shaft (20).

17. A planetary gear unit, comprising:

sun, planet and ring gears;

a planet carrier comprising a planet bogie plate and at least one planet shaft on both sides of the planet bogie plate;

a planet wheel mounted on the at least one planet shaft via taper roller bearings;

an axially displaceable piece on each of extremities of the at least one planet shaft forming an abutment which provides an axial support for inner bearing rings of said taper roller bearings, both axially displaceable pieces being formed by abutment plates, respectively a first abutment plate and a second abutment plate;

a tensioning device by which said axially displaceable pieces can be displaced toward one another for controlling pre-tensioning on the taper roller bearings, the tensioning device comprising a central rod which can be brought into an axial passage provided in the planet shaft, the rod being connectable to the first abutment plate at a first extremity of the rod, while the rod passes through a central hole provided in the second abutment plate at a second extremity of the rod, the second extremity being provided with an external thread on which a nut can be screwed against the second abutment plate; and a lock provided by which said axially displaceable pieces can be locked on the planet shaft in order to prevent said axially displaceable pieces from rotating with respect to the at least one planet shaft.

\* \* \* \* \*